(12) United States Patent
Okamoto

(10) Patent No.: US 8,540,261 B2
(45) Date of Patent: Sep. 24, 2013

(54) SUSPENSION ARM ATTACHMENT STRUCTURE

(75) Inventor: Kimio Okamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/699,559

(22) PCT Filed: May 23, 2011

(86) PCT No.: PCT/JP2011/061742
§ 371 (c)(1),
(2), (4) Date: Nov. 21, 2012

(87) PCT Pub. No.: WO2011/148893
PCT Pub. Date: Dec. 1, 2011

(65) Prior Publication Data
US 2013/0062853 A1    Mar. 14, 2013

(30) Foreign Application Priority Data

May 25, 2010 (JP) ................................. 2010-119736

(51) Int. Cl.
*B60G 7/02* (2006.01)
(52) U.S. Cl.
USPC ............................. 280/124.134; 280/124.109
(58) Field of Classification Search
CPC ...... B60G 7/02; B60G 7/006; B60G 2200/14;
B60G 2200/142; B60G 2200/1424; B60G
2200/144; B60G 2200/154; B60G 2204/10;
B60G 2204/143; B60G 2204/4302; B60G
2204/1431; B60G 2204/1432

USPC .................... 280/124.109, 124.134, 124.135,
280/785; 180/312; 403/122, 132, 133, 135
See application file for complete search history.

(56) References Cited

U.S. PATENT DOCUMENTS

| 5,127,666 | A | 7/1992 | Fujinaka et al. | |
|---|---|---|---|---|
| 2006/0151970 | A1* | 7/2006 | Kaminski et al. | 280/124.134 |

FOREIGN PATENT DOCUMENTS

| EP | 1 932 692 A1 | 6/2008 |
|---|---|---|
| JP | 3-128711 A | 5/1991 |
| JP | 04-126676 A | 4/1992 |
| JP | 06-286641 A | 10/1994 |
| JP | 2000-238662 A | 9/2000 |
| JP | 2003-154966 A | 5/2003 |
| JP | 2003-294084 A | 10/2003 |
| JP | 2010090922 A * | 4/2010 |

* cited by examiner

*Primary Examiner* — Joseph Rocca
(74) *Attorney, Agent, or Firm* — Carrier Blackman & Associates, P.C.; William D. Blackman; Joseph P. Carrier

(57) ABSTRACT

A suspension arm attachment structure provided with a cylindrical vibration-damping bush which is attached to the side of a vehicle body via a core member. The attachment structure is provided with: a suspension arm having an attachment tube part fitted with a vibration-damping bush; and a retaining member which regulates the movement of the attachment tube part in the axial longitudinal direction. The retaining member is provided with: facing walls on sides thereof which respectively face end surfaces of the vibration-damping bush; a linking part which integrally links the facing walls; and an attachment part on one end and an attachment part on the other end which respectively extend in the axial longitudinal direction of a core member from the facing surface on one side and the facing surface on the other side and which are attached to the side of a vehicle body.

6 Claims, 13 Drawing Sheets

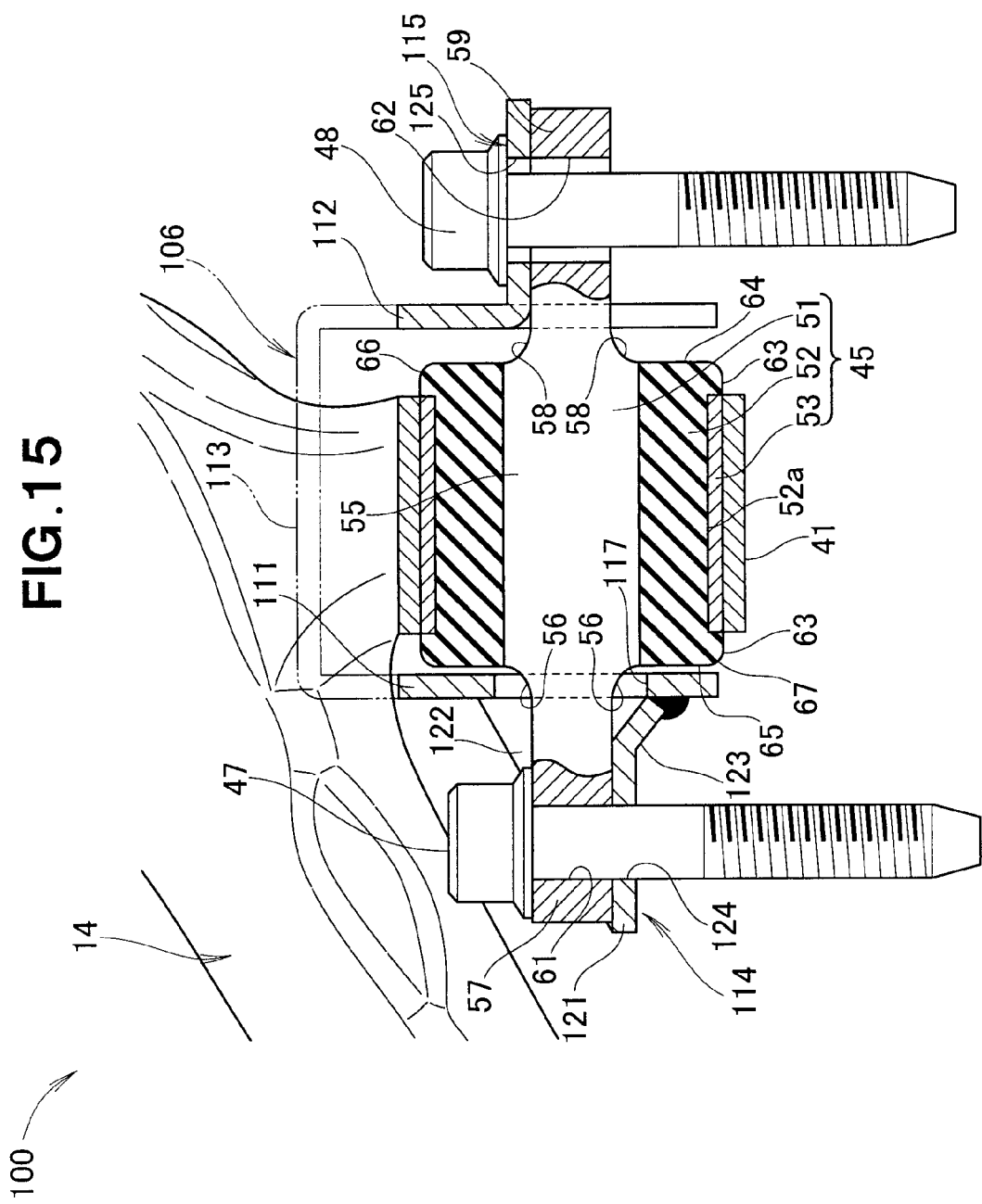

SUSPENSION ARM ATTACHMENT STRUCTURE

TECHNICAL FIELD

The present invention relates to a suspension arm attachment structure including a tubular vibration-damping bush adapted to be fitted in a tubular attachment part of a suspension arm and to be attached to a vehicle body via a core member.

BACKGROUND ART

One of such suspension arm attachment structures is comprised of a suspension arm (lower arm), a tubular attachment part formed on an end part of the suspension arm, a vibration-damping bush fitted in the tubular attachment part, and a core member forming a shaft part of the vibration-damping bush. In this structure, both ends of the core member are attached to the suspension member with bolts via separately formed stopper members.

Known from such suspension arm attachment structure is a technology for preventing detachment of the tubular attachment part of the suspension arm from the vibration-damping bush when an excessive load is applied to the suspension arm from a road wheel side. This technology is disclosed in, for example, Patent Literature 1.

The suspension arm attachment structure of Patent Literature 1, however, has a difficulty in properly providing a contact surface of the stopper member in parallel to an end surface of the vibration-damping bush, because of its configuration that each end of the core member is attached to the vehicle body side with the bolt via the separately formed stopper member. Such a configuration can cause an undesired one-side hitting of the end surface of the vibration-damping bush with respect to the contact surface of the stopper member due to, for example, a variation in attachment of the stopper member. This may result in unsuccessful fulfillment of the spring characteristics of the vibration-damping bush with respect to the stopper member, which spring characteristics is selectively chosen in advance.

PRIOR ART LITERATURE

Patent Literature

Patent Document 1: Japanese Utility Model Application Laid-Open Publication No. H02-114583

SUMMARY OF INVENTION

Technical Problem

It is therefore an object of the present invention to provide a suspension arm attachment structure provided with an improved accurate parallel disposition between a vibration-damping bush and a stopper member, and successful fulfillment of the spring characteristics of the vibration-damping bush.

Solution to Problem

In order to accomplish the above mentioned object, the present invention provides a suspension arm attachment structure which comprises: a suspension arm adapted to be mounted to a vehicle body and connected to a knuckle supporting a vehicle wheel; a tubular attachment part provided to the suspension arm and supported so as to be swingable toward the vehicle body; a tubular vibration-damping bush fitted in the tubular attachment part and adapted to be mounted to the vehicle body via a core member; and a stopper member for preventing axial movement of the tubular attachment part, wherein the stopper member comprises: a pair of opposite walls provided in opposed relation to end surfaces of the vibration-damping bush; a connection part integrally connecting the opposite walls together; and a pair of attachment parts each extending axially of the core member from the respective opposite walls.

Preferably, the stopper member is adapted to be secured to the vehicle body together with the core member via bolts.

It is desirable that the vibration-damping bush be disposed so as to extend in a longitudinal direction of the vehicle body, one of the opposite walls have a through-hole for receiving one side of the core member and be disposed adjacent to a vehicle-rear-side end surface of the vibration-damping bush to nearly fully cover the vehicle-rear-side end surface, and other one of the opposite walls be disposed adjacent to a vehicle-front-side end surface of the vibration-damping bush to cover only that part of the vehicle-front-side end surface which is on a side of the connection part.

Preferably, the other one of the opposite walls of the stopper member is set to have an outer dimension larger than that of the vehicle-front-side end surface of the vibration-damping bush and is provided with a concave part for receiving the core member.

It is preferred that the one of the attachment parts of the stopper member be formed separately from the one of the opposite walls and joined thereto, the one of the attachment parts comprise a body part formed to allow passage of the bolt therethrough and adapted to be attached together with the core member to the vehicle body, a reinforcement part bent and continuing from the body part for reinforcing the one of the attachment parts, and an inclined-surface part provided in a bent fashion on a side of the body part which is closer to the vibration-damping bush and adapted to allow passage of the core member therethrough, and end parts of the reinforcement part and the inclined-surface part be welded to a vicinity of the through-hole of the one of the opposite walls.

Advantageous Effects of Invention

In the suspension arm attachment structure of the present invention, it becomes possible to place the pair of opposite walls of the stopper member parallely to the respective end surfaces of the vibration-damping bush with improved accuracy. This results in successful prevention of one-side hitting of the end surfaces of the vibration-damping bush with respect to the respective opposite walls. Such a desirable operation is accomplished thanks to the configuration of the stopper member including the opposite walls facing the respective end walls of the vibration-damping bush, the connection member integrally connecting the opposite walls together, and the attachment parts extending axially of the core member from the respective opposite walls and connected to the vehicle body.

More specifically, the accurate disposition of the opposite walls of the stopper member with respect to the corresponding end surfaces of the vibration-damping bush can be accomplished by the opposite walls disposed accurately in a parallelly face-to-face manner, integrally and firmly connected together with the connection part, and attached to the vehicle body through the pair of attachment parts together with the core member. Prevention of one-side hitting accomplished by such an arrangement allows the vibration-damping bush to successfully fulfill its spring characteristics, which is selectively chosen in advance, at a time of contact with the stopper member.

With the stopper member secured to the vehicle body together with the core member using the bolts, it becomes possible to reduce the number of parts required in the manufacture of the suspension arm attachment structure.

Furthermore, prevention of detachment of the tubular attachment part from the vehicle body side can be assured because of the stopper member whose one opposite wall is located close to the rear-end surface of the vibration-damping bush, which is disposed in the longitudinal direction of the vehicle, so as to nearly fully cover the rear-end surface. With such an operation, successful fulfillment of the spring characteristics of the vibration-damping bush can be accomplished at a time of contact of the rear-end surface to the one opposite wall of the stopper member.

The other one of the opposite walls of the stopper member located on a front side of the vehicle is recognized to receive a little load. Upon consideration of such recognition, the other one of the opposite walls disposed relatively close to the front-end surface of the vibration-damping bush is arranged to cover the front-end surface only at a side of the connection part thereof. This arrangement enables an easy mounting operation of the stopper member to the core member.

Since the other opposite wall of the stopper member has a larger outer dimension than the front-end surface of the vibration-damping bush and is provided with the concave part for the core member to pass through, a region of the second opposing wall to be opposed to the vibration-damping bush can be enlarged and a mounting operation of the core member can be facilitated.

Furthermore, the one attachment part is provided with improved strength thanks to its configuration that it is separately formed and then joined to the one opposite wall and is comprised of the body part to be attached to the vehicle body together with the core member by passage of the bolts, and the reinforcement part continuously bent from the body part to reinforce the one attachment part. The strengthened one attachment part provides improved accuracy in attachment of the stopper member to the vehicle body side by serving as an indexing member for the stopper member. Moreover, the one attachment part allows an easy installation of the core member to the stopper member by the inclined-surface part continuously bent from the body part, which inclined-surface part permits an easy passage of the core member through the through-hole of the one opposing wall.

Furthermore, the reinforcement part can further improve the strength and rigidity of the one opposite wall because the end parts of the reinforcement part and the inclined-surface part are welded to the one opposite wall at a near side of the through-hole. This allows the first opposing wall to assuredly receive the rear-end surface of the vibration-damping bush even if an excessive load is applied to the vibration-damping bush.

BRIEF DESCRIPTION OF DRAWINGS

FIG. 15 is a cross-sectional view showing the suspension arm attachment structure taken along line 15-15 of FIG. 14.

DESCRIPTION OF EMBODIMENTS

Suspension arm attachment structures according to several preferred embodiments of the present invention will now be described below with reference to the accompanying drawings.

First Embodiment

Figure 1:
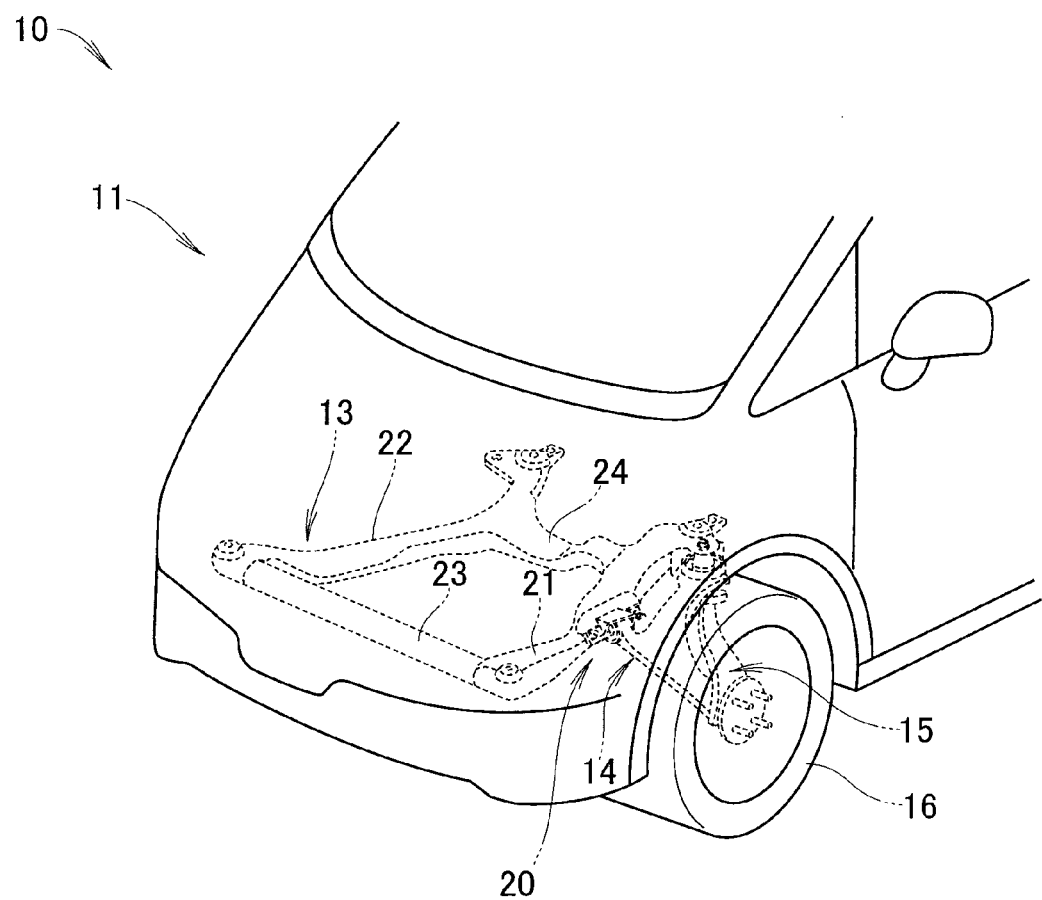
FIG. 1 is a perspective view showing a vehicle employing a suspension arm attachment structure according to the present invention.
Figure 2:
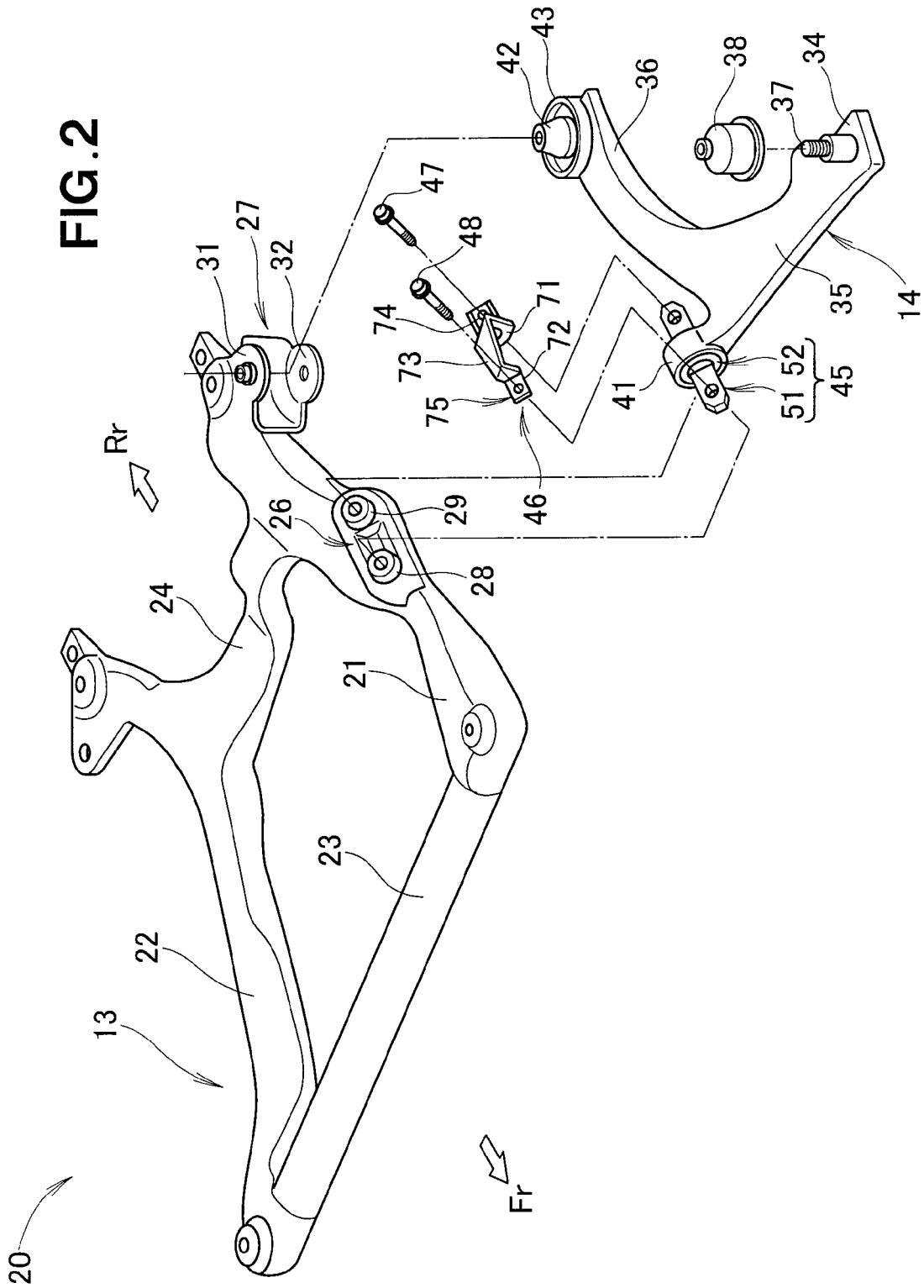
FIG. 2 is an exploded perspective view showing a sub-chassis and a suspension arm of the suspension arm attachment structure according to the present invention.
Figure 3:
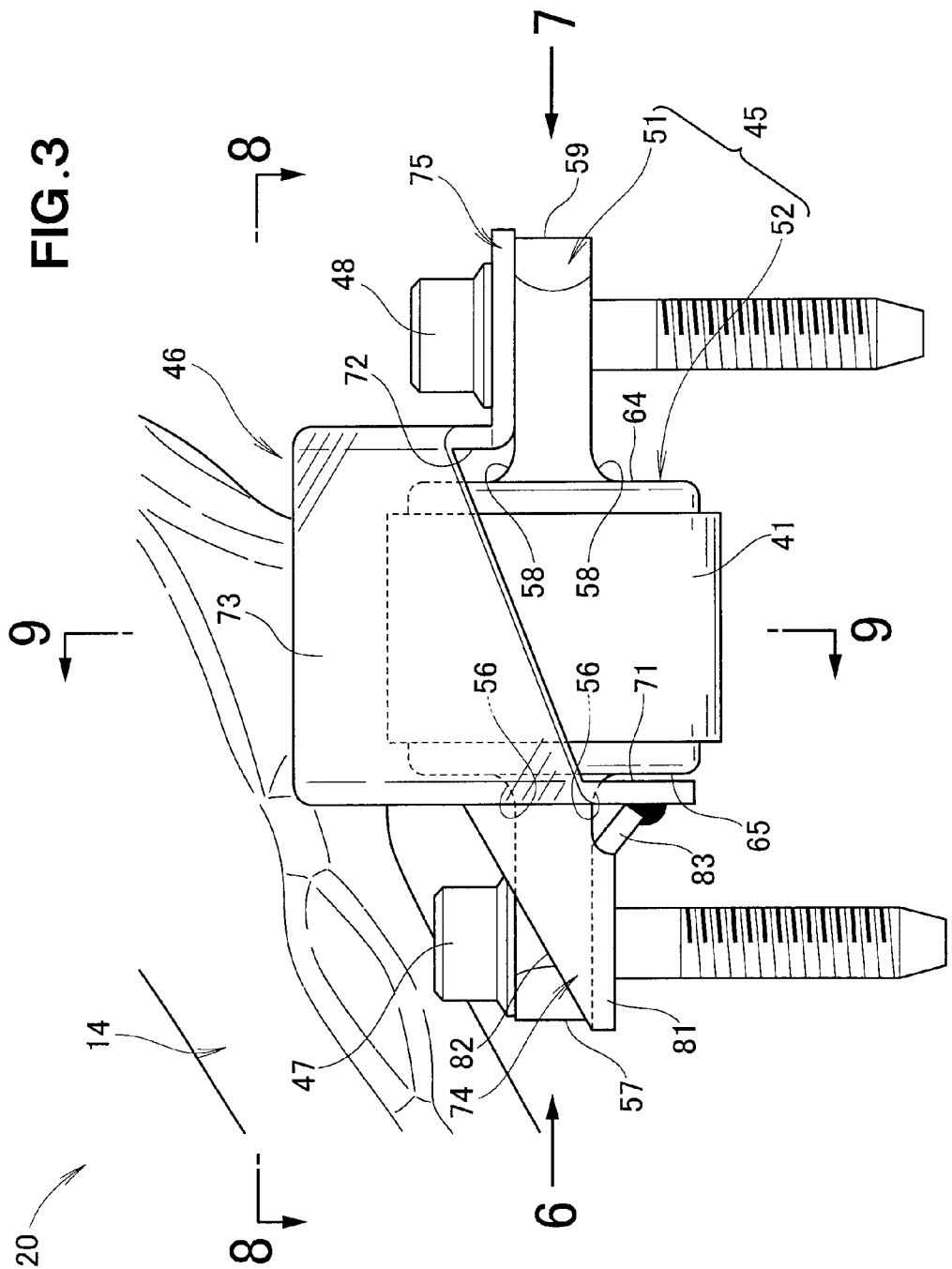
FIG. 3 is a front elevational view showing a suspension arm attachment structure according to a first embodiment of the present invention.
Figure 4:
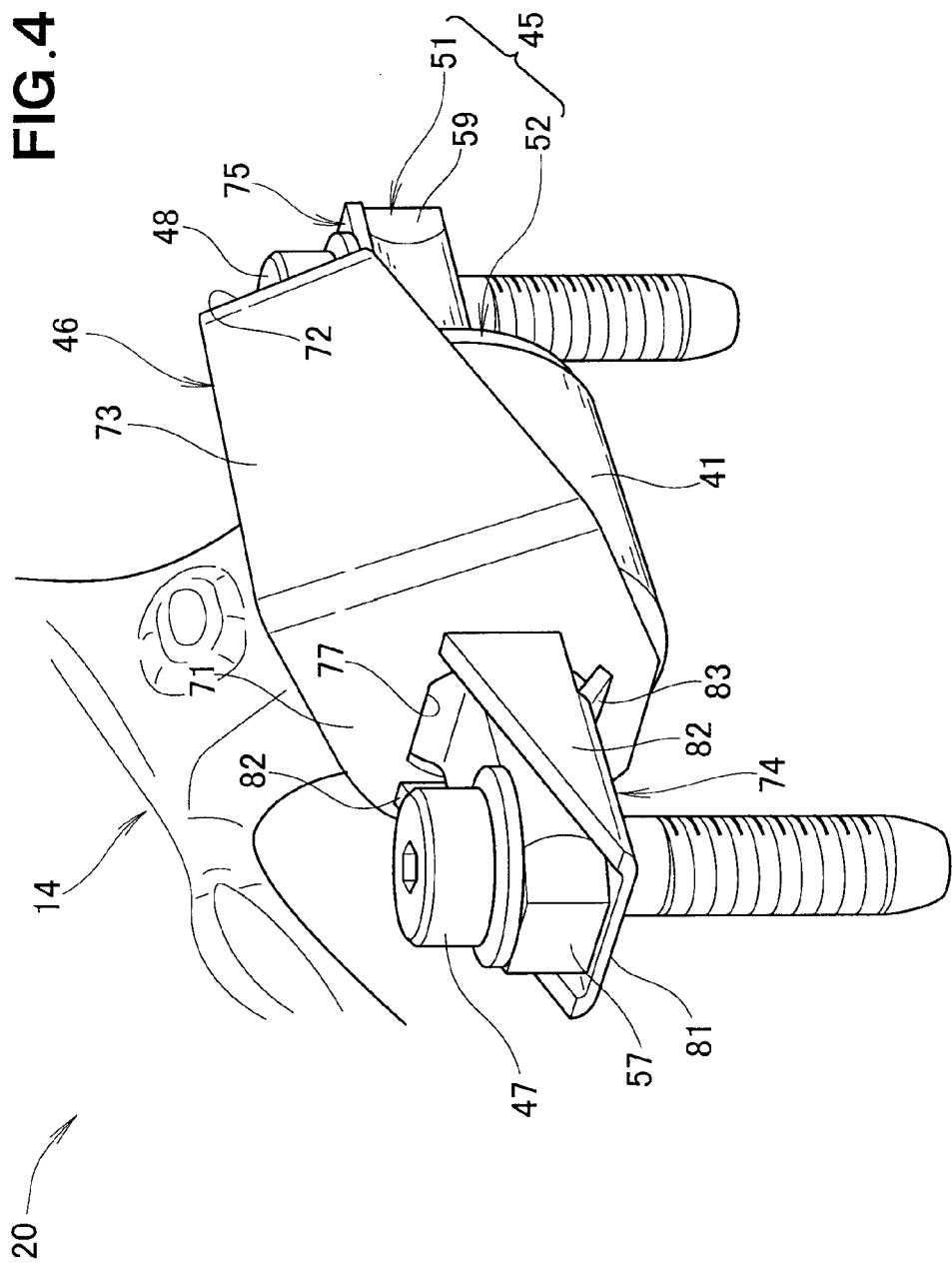
FIG. 4 is a perspective view showing the suspension arm attachment structure of FIG. 3, as seen from a rear side of a vehicle body.
Figure 5:
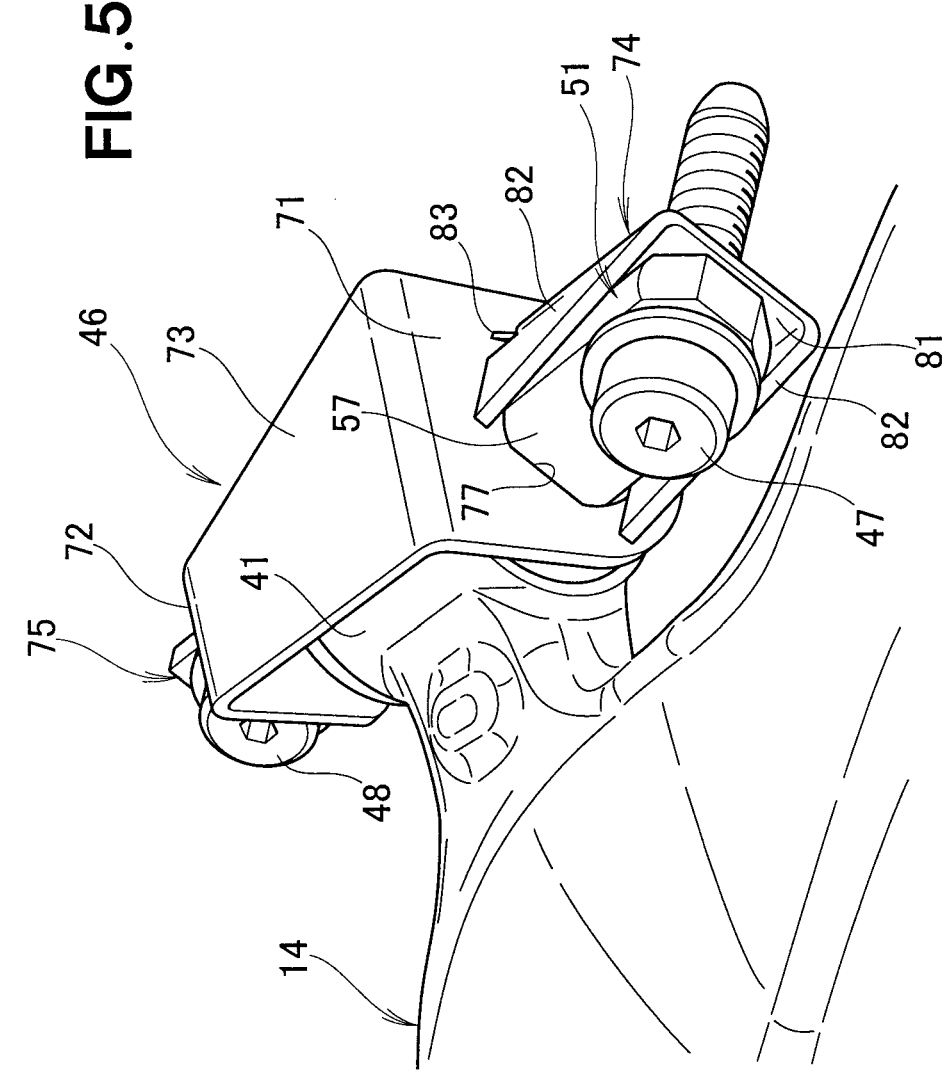
FIG. 5 is a perspective view showing the suspension arm attachment structure of FIG. 3, as seen from a passenger compartment side of the vehicle.
Figure 6:
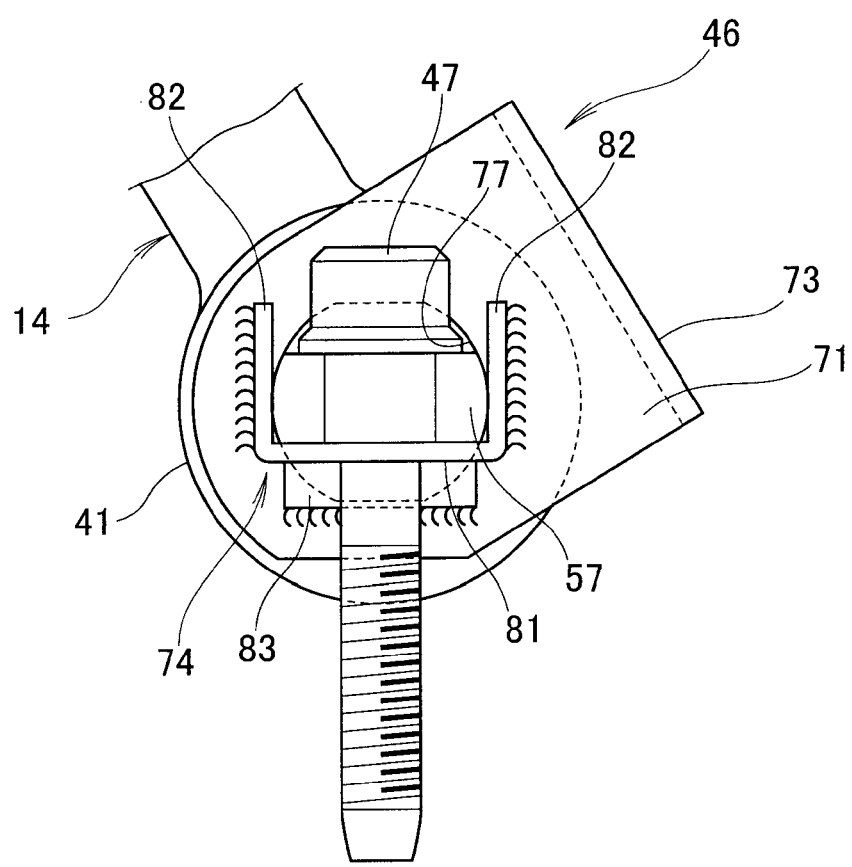
FIG. 6 shows the suspension arm attachment structure of FIG. 3, as seen in the direction of arrow 6.
Figure 7:
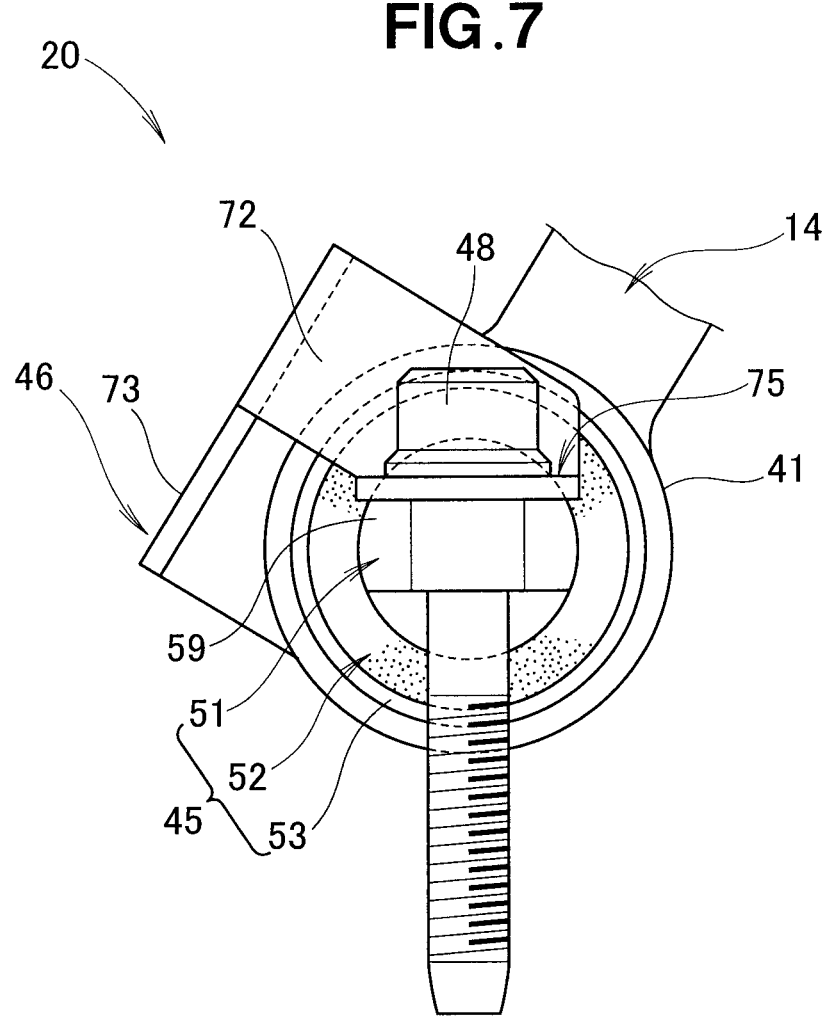
FIG. 7 shows the suspension arm attachment structure of FIG. 3, as seen in the direction of arrow 7.

A suspension arm attachment structure of a first embodiment of the present invention is mounted on a vehicle 10 in a manner as shown in FIGS. 1 and 2. The vehicle 10 includes a vehicle body 11, a front sub-chassis 13 mounted on the vehicle body 11 to support devices such as an engine (not shown) and a gear box, a suspension arm 14 swingably supported by the front sub-chassis 13, a knuckle 15 supported by the suspension arm 14, and a wheel 16 held by the knuckle 15.

The suspension arm attachment structure 20 of the first embodiment is mounted on the vehicle body 11 and includes the suspension arm 14 connected to the knuckle 15 that holds the wheel 16, a tubular attachment part 41 provided to the suspension arm 14 and swingably supported by the vehicle body 11, a core member 51, a tubular vibration-damping bush 52 to be attached to the vehicle body 11 via the core member 51, and a stopper member 46 arranged to control an axial movement of the tubular attachment part 41.

The core member 51 is secured to the front sub-chassis 13 of the vehicle body 11 side together with the stopper member 46 by bolts (fastening members) to thereby allow the suspension arm 14 of the suspension arm attachment structure 20 to move swingably with respect to the vehicle body 11 side, as will be described later.

The front sub-chassis 13 has a generally rectangular shape and includes left and right vertical members 21, 22 extending in a longitudinal direction of the vehicle body 11, and front- and rear-lateral members 23, 24 extending between front ends and rear ends of the respective vertical members 21, 22.

The left vertical member 21 has front- and rear-arm-supporting members 26, 27 used to support the suspension arm 14 swingably. The front-arm-supporting member 26 has front- and rear-bolt-attaching parts 28, 29 used for mounting the suspension arm 14. The rear-arm-supporting part 27 has upper- and lower-flange parts 31, 32 used for mounting the suspension arm 14. The right vertical member 22 is formed substantially identically to the left vertical member 21.

The suspension arm (lower arm) 14 supports a lower part of the knuckle 15, has a generally L-shaped profile, and includes a knuckle-connecting part 34 for connecting the knuckle 15, a lateral arm 35 extending inwardly of the vehicle 10 from the knuckling-connecting part 34, and a vertical arm 36 extending longitudinally of the vehicle body 11 from the lateral arm 35.

The knuckle-connecting part 34 is provided with a shoulder bolt 37 to support the knuckle 15 via a knuckle side bush 38. The lateral arm 35 is provided at its vehicle body 11 side with the tubular attachment part 41 that is attached to the front-arm-supporting part 26 of the front sub-chassis 13 via the vibration-damping bush 52. The vertical arm 36 is provided at its rear end with a rear attachment part 43 to be attached to the rear-arm-supporting part 27 of the front sub-chassis 13 via a vertical bush 42.

The suspension arm attachment structure 20 of the first embodiment will be further described in detail with reference to FIGS. 2 to 12.

As shown particularly in FIGS. 2 to 5, the suspension arm attachment structure 20 includes the front-arm-supporting part 26 formed on the front sub-chassis 13, the suspension arm 14, the tubular attachment part 41, the stopper member 46, and the bolts (fastening members) 47, 48. The structure 20 also includes a vibration-damping bush assembly 45.

Figure 8:
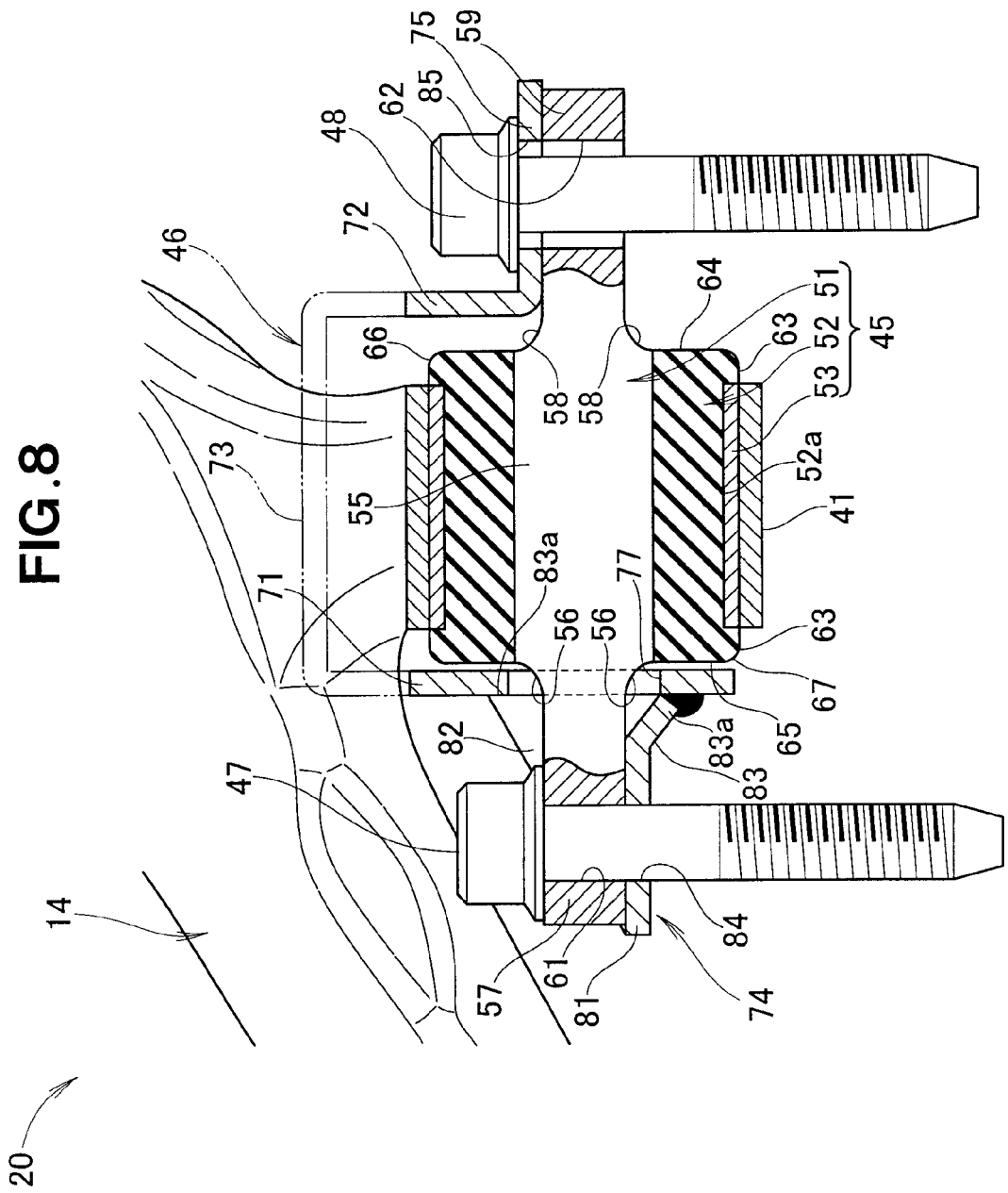
FIG. 8 is a cross-sectional view taken along line 8-8 of FIG. 3.

As specifically illustrated in FIG. 8, the vibration-damping bush assembly 45 is comprised of the core member (shaft) 51 made of metal, the tubular vibration-damping bush 52 made of elastic material, having a circumferential concave 52a on the center portion of its outer circumference and surrounding an outer circumference of the core member 51, and an external cylinder 53 provided so as to be fitted in the circumferential concave 52a of the vibration-damping bush 52. End surfaces 63, 63 of the outer circumference of the vibration-damping bush 52 and an outer circumference of the external cylinder 53 together form a flush surface so that no unevenness is formed therebetween.

Figure 9:
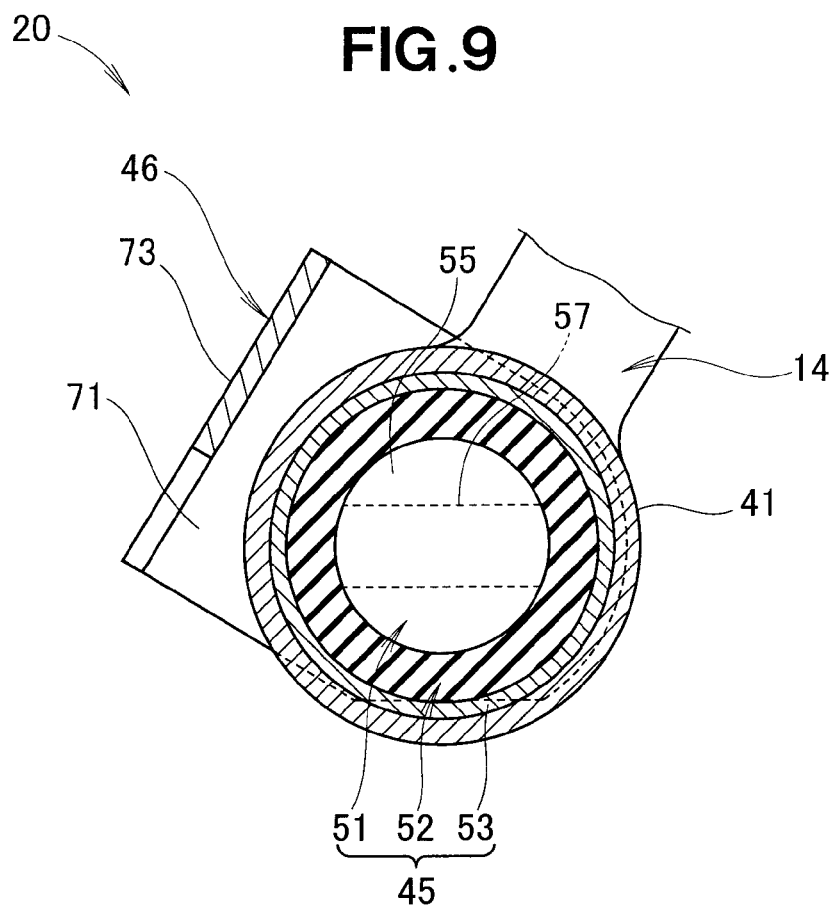
FIG. 9 is a cross-sectional view taken along line 9-9 of FIG. 3.
Figure 10:
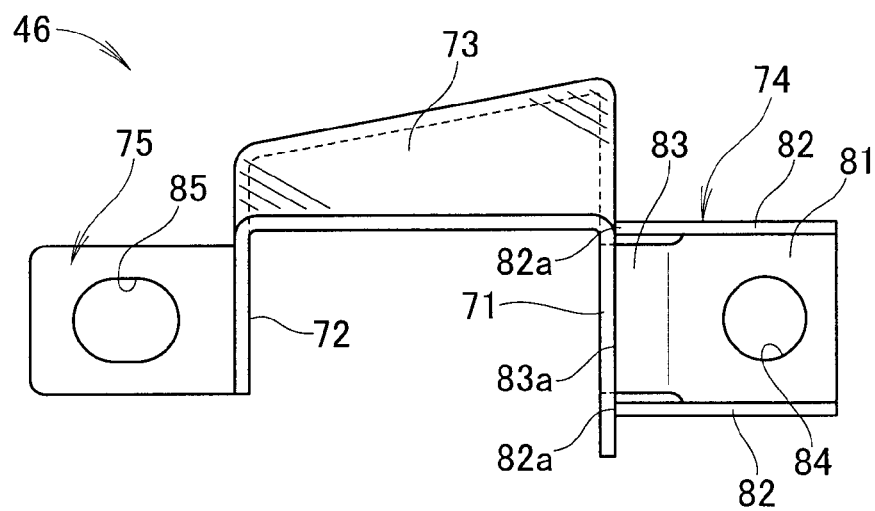
FIG. 10 is a top plan view showing a stopper member illustrated in FIG. 3.
Figure 11:
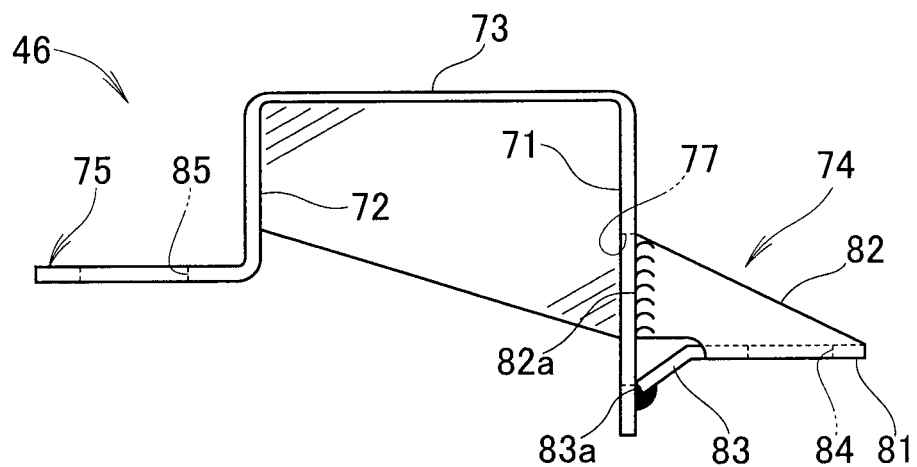
FIG. 11 is a rear view showing the stopper member of FIG. 10.

As shown in FIGS. 8 and 9, the core member 51 is comprised of a part 55 surrounded by the vibration-damping bush 52, first curved parts 56, 56, second curved parts 58, 58, and first and second flat parts 57, 59 formed in flat and continuing from the cylindrical part 55 through the respective curved parts 56, 56, 58, 58.

The first flat part 57 has a round hole 61 serving as an indexing hole, while the second flat part 59 has a long hole 62 for absorbing variation in attachment of the core member 51.

The vibration-damping bush 52 is a tubular-shaped member, and has an outer circumference surface 63, a vehicle-body-front-side end surface 64 (hereinafter referred to as "front-end surface 64"), a vehicle-body-rear-side end surface 65 (hereinafter referred to as "rear-end surface 65"), and curvedly formed chamfered surfaces 66, 67 formed between the outer circumference surface 63 and the respective front- and rear-end surfaces 64, 65.

The external cylinder 53 is provided with an axial length arranged substantially equal to that of the tubular attachment part 41, so that only the end surfaces 64, 65 of the vibration-damping bush 52 made of elastic material are exposed.

As shown in FIGS. 5 to 8, and 10 to 12, the stopper member 46 is comprised of a pair of opposite walls 71, 72 opposed to the respective end surfaces 64, 65 of the vibration-damping bush 52, a connection part 73 integrally connecting the opposite walls 71, 72, and a pair of attachment parts 74, 75 extending axially outwardly of the core member 51 from the respective opposite walls 71, 72 to be attached to the vehicle body 11 together with the core member 51.

One opposite wall 71 has a through-hole 77 for receiving the first flat part 57 and the curved part 56 of the core member 51. The one opposite wall 71 is disposed closely to the rear-end surface 65 of the vibration-damping bush 52 and nearly fully covers the rear-end surface 65.

The distance between the opposite walls 71, 72 is set to be longer than the length of the vibration-damping bush 52 to provide gaps between the walls 71, 72 and the respective end surfaces 64, 65 of the vibration-damping bush 52. The gap between the one opposite wall 71 and the rear-end surface 65 is set to be smaller than that between the other opposite wall 72 and the front-end surface 64. This is due to a general operation of a suspension arm that is pulled backward when a vehicle climbs over an object. The narrow gap between the one opposite wall 71, located at a rear side of the vehicle, and the rear-end surface 65 allows an easy contact therebetween and permits the vibration-damping bush 52 to successfully fulfill its vibration-damping effect.

Other opposite wall 72 is disposed relatively closely to the front-end surface 64 of the vibration-damping bush 52 and covers the front-end surface 64 merely at a side of the connection part 73 thereof.

One attachment part 74 of the stopper member 46 is separately formed from the one opposite wall 71 and is joined thereto. The one attachment part 74 is comprised of a body part 81 to be attached to the front-arm-supporting part 26 of the front sub-chassis 13 in the vehicle body 11 side together with the core member 51, reinforcement parts 82, 82 continuously bent from the body part 81 to reinforce the first attachment part 74, an inclined-surface part 83 continuously bent from the body part 81 at a side of the vibration-damping bush 52 thereof and adapted to allow passage of the core member 51, and an indexing hole 84 provided to the body part 81 for indexing the position of the stopper member 46 in corporation with a bolt 47 passing through the body part 81.

Figure 12:
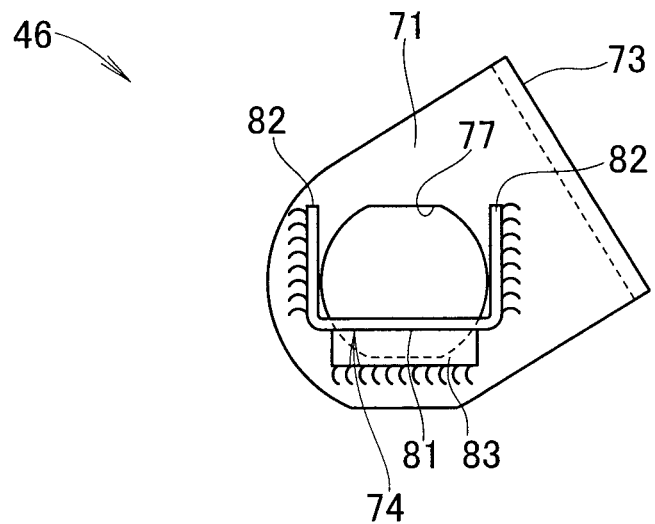
FIG. 12 is a side view showing the stopper member of FIG. 11.

As shown in FIG. 12, the one attachment part 74 has the body part 81 and the two reinforcement parts 82, 82, thereby forming a substantially U-shaped profile. Each of the reinforcement parts 82, 82 has an end part 82a that is welded to the one opposite wall 71 at a near side of the through-hole 77. The inclined surface part 83 also has an end part 83a that is welded to the same wall 71 at a near side of the through-hole 77.

Other attachment part 75 of the stopper member 46 is continuously bent from the connection part 73 and has a through-hole 85 formed in a shape of a long hole for receiving a bolt 48. The opposite walls 74, 75 are secured to the front-arm-supporting part 26 of the vehicle body 11 side together with the core member 51 by the bolts (fastening members) 47, 48.

As described above with reference to FIGS. 1 to 12, the suspension arm attachment structure 20 of the first embodiment is mounted on the vehicle body 11 and includes the suspension arm 14 connected with the knuckle 15 holding the wheel 16, the tubular attachment part 41 provided to the suspension arm 14 and swingably supported by the vehicle body 11, the core member 51, the tubular vibration-damping bush 52 to be attached to the vehicle body 11 via the core member 51. The suspension arm attachment structure 20 further includes the stopper member 46 arranged to control axial movement of the tubular attachment part 41.

According to the suspension arm attachment structure 20 of the first embodiment of the present invention, it becomes possible to place with improved accuracy the opposite walls 71, 72 of the stopper member 46 parallely to the respective end surfaces 64, 65 of the vibration-damping bush 52. This results in successful prevention of one-side hitting of the end surfaces 64, 65 of the vibration-damping bush 52 with respect to the respective opposite walls 71, 72. Such a desirable operation is accomplished thanks to the configuration of the stopper member 46 including the pair of opposite walls 71, 72 facing the respective end walls 64, 65 of the vibration-damping bush 52, the connection member 73 integrally connecting the opposite walls 71, 72 together, and the pair of attachment parts 74, 75 extending axially of the core member 51 from the respective opposite walls 71, 72 and connected to the vehicle body 11 side.

More specifically, the accurate disposition of the opposite walls 71, 72 of the stopper member 46 with respect to the corresponding end surfaces 64, 65 of the vibration-damping bush 52 can be accomplished owing to the opposite walls 71, 72 connected together integrally with the connection part 73 and to the core member 51 with its attachment parts 74, 75 connected to the vehicle body 11. This enables the vibration-damping bush 52 to have spring characteristics set to function as desired, as the vibration-damping bush 52 and the stopper member 46 hit with each other, Since the stopper member 46 is secured to the vehicle body 11 together with the core member 51 using the bolts 47, 48, it becomes possible to reduce the number of required parts.

Note, for example, that the suspension arm (lower arm) 14 is often pulled rearwardly of the vehicle body 11 when the vehicle 10 is braked or travels over a bump.

The vibration-damping bush 52 is disposed such that its axis lies in the longitudinal direction of the vehicle, and one opposite wall 71 is placed closely to the rear-end surface 65 of the vibration-damping bush 52 to substantially fully cover the surface 65. This can assuredly prevent detachment of the tubular attachment part 41 of the suspension arm 14, and allows the vibration-damping bush 52 to fulfill its target spring characteristics when the rear-end surface 65 hits the first opposing wall 71 of the stopper member 46.

It is know that the other opposite wall 72 of the stopper member 46 located on a front side of the vehicle receives only a little load. With this taken into consideration, the other opposing wall 72 disposed relatively closely to the front-end surface 64 of the vibration-damping bush 52 is arranged to cover the front end-surface 64 only at a side of the connection part 73 thereof. This arrangement enables an easy mounting operation of the stopper member 46 to the core member 51.

The one attachment part 74 of the stopper member 46 has a tough mechanical strength, since it is separately formed and joined to the one opposite wall 71, and is comprised of the body part 81 to be attached to the vehicle body 11 together with the core member 51 by the bolts passing through the body part 81, and reinforcement parts 82, 82 continuing in a bent fashion from the body part 81 for reinforcement of the first attachment part 74. The mechanically tough one attachment part 74 provides improved accuracy in attachment of the stopper member 46 to the vehicle body 11 side by serving as an indexing member.

Portion extending from the body part 81 at a side of the vibration-damping bush 52 is bent to form an inclined-surface part 83 that allows easy passage of the core member 51 onto the body part 81.

End parts 82a, 82a of the reinforcement parts 82, 82 and end part 83a of the inclined surface part 83 are weld-connected to a vicinity around the through-hole 77 of the first opposing wall 71, providing more improved strength and rigidity to the one opposite wall 71. Thus, the one opposite wall 71 can surely receive the rear-end surface 65 of the vibration-damping bush 52 even when an excessive load is applied to the vibration-damping bush 52.

Second Embodiment

Figure 13:
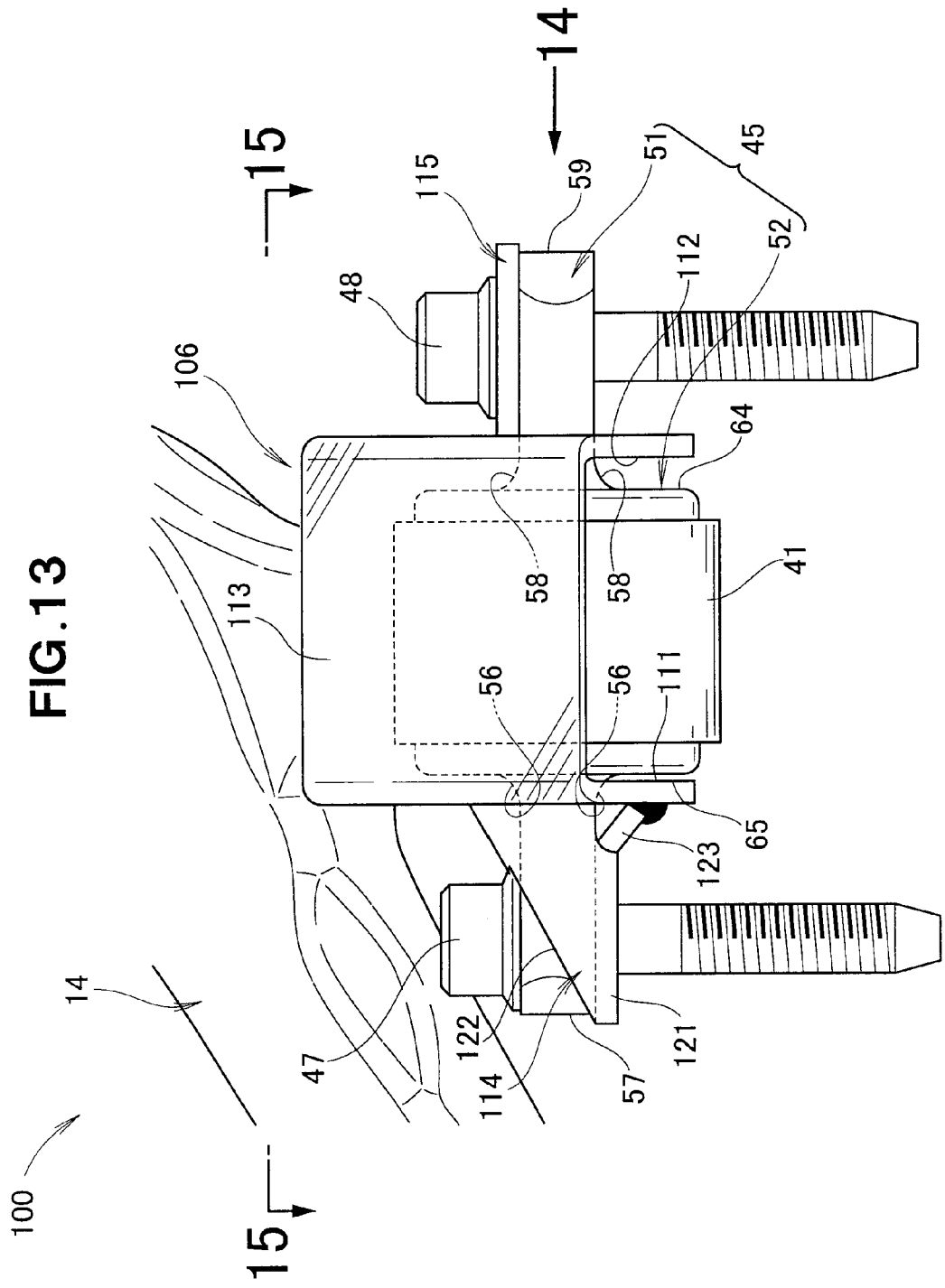
FIG. 13 is a front view showing a suspension arm attachment structure according to a second embodiment of the present invention.
Figure 14:
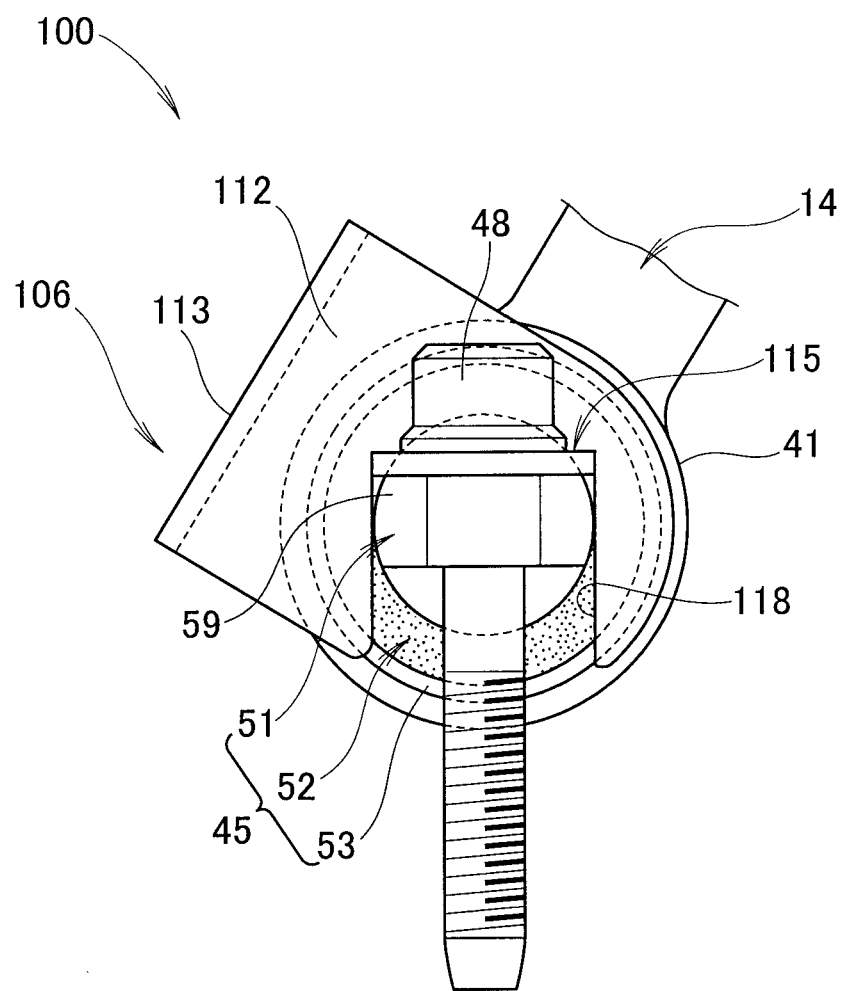
FIG. 14 is a side view showing the suspension arm attachment structure of FIG. 13, as seen in the direction of arrow 14.

A suspension arm attachment structure 100 according to a second embodiment of the present invention will be described next with reference to FIGS. 13 to 15. In the second embodiment, like components used in the suspension arm attachment structure 20 in the first embodiment shown in FIGS. 1 to 12 are provided with the same reference numerals and detailed descriptions thereof are omitted.

The suspension arm attachment structure 100 includes a front-arm-supporting member 26 of the front sub-chassis 13 (see FIG. 2), a suspension arm 14 including a tubular attachment part 41, a vibration-damping bush 52, a stopper member 106 and bolts 47, 48. The vibration-damping bush 52 with a combination of a core member (shaft) 51 and an external cylinder 53 configures a vibration-damping bush assembly 45.

The stopper member 106 includes a pair of opposite walls 111, 112 disposed in opposed relation to respective rear- and front-end surfaces 65, 64 of the vibration-damping bush 52, a connection part 113 integrally connecting the opposite walls 111, 112 together, and a pair of attachment parts 114, 115 extending longitudinally of the core member 51 from the respective opposite walls 111, 112. The first opposing wall 111 and the first attachment part 114 are formed identically to the one opposite wall 71 and the one attachment part 74, respectively, of the first embodiment shown in FIG. 8.

The one opposite wall 111 is provided with a through-hole 117 that receives a flat part 57 and curved parts 56, 56 formed at a side of the core member 51. The other opposite wall 112 has a larger outer dimension than that of the front-end surface 64 and is provided with a concave part 118 that allows the core member 51 to pass therethrough.

The one attachment part 114 is separately formed from the one opposite wall 111 and joined thereto. The one attachment part 114 has a body part 121, reinforcement parts 122, 122 (only one shown), an inclined surface part 123 and an indexing hole 124. The other attachment part 115 is bent and continues from the connection part 113 and has a through-hole for receiving the bolt 48.

In the second embodiment of the present invention, since the other opposite wall 112 has a larger outer dimension than that of the end surface 64 of the vibration-damping bush 52 and is provided with the concave part 118 for passage of the core member 51, a region of the other opposite wall 112 to be opposed to the vibration-damping bush 52 can be enlarged and a mounting operation of the core member can be facilitated.

As shown in FIG. 8, although the vibration-damping bush assembly 45 in the suspension arm attachment structure 100 of the present invention is comprised of the core member (shaft) 51, the vibration-damping bush 52 and the external cylinder external cylinder 53, it is not limited to such a configuration and may be comprised of the core member (shaft) 51, the vibration-damping bush 52 and an internal cylinder disposed therebetween.

As shown in FIG. 2, the suspension arm attachment structure according to the present invention is adapted to support a front portion of the suspension arm (lower arm) 14, but it is not limited to such an arrangement and can be of supporting any portions of the suspension arm 14.

Furthermore, in the suspension arm attachment structure of the present invention, the first attachment part 74 of the stopper member 46 can be comprised of the body part 81 and two reinforcement parts 82, 82, forming a U-shaped profile as shown in FIG. 2, but it can be comprised of a body part and a reinforcement part, thereby forming a L-shaped profile.

INDUSTRIAL APPLICABILITY

The suspension arm attachment structure according to the present invention, which includes a tubular vibration-damping bush fitted in a tubular attachment part of a suspension arm to be attached to a vehicle body side via a core member, is particularly suitable for use on automobiles.

REFERENCE SINGS LIST

10 vehicle; 11 vehicle body; 14 suspension arm; 15 knuckle; 16 wheel; 20, 100 suspension arm attachment structure; 41 tubular attachment part; 46 stopper member; 47, 48 bolts; 51 core member; 52 vibration-damping bush; 64 vehicle-body-front-side end surface (front-end surface); 65 vehicle-body-rear-side end surface (rear-end surface); 71 first opposing wall; 72 second opposing wall; 73 connection part; 74 first attachment part; 75 second attachment part; 77 through-hole; 81 body part; 82 reinforcement part; 82a end part; 83 inclined surface part; 83a end part; 112 second opposing wall; 118 concave part.

The invention claimed is:

1. A suspension arm attachment structure comprising:
   a suspension arm adapted to be mounted to a vehicle body and connected to a knuckle supporting a vehicle wheel;
   a tubular attachment part provided to the suspension arm and supported so as to be swingable toward the vehicle body;
   a tubular vibration-damping bush fitted in the tubular attachment part and adapted to be mounted to the vehicle body via a core member; and
   a stopper member for preventing axial movement of the tubular attachment part, wherein the stopper member comprises:
   a pair of opposite walls provided in opposed relation to end surfaces of the vibration-damping bush, said opposite end walls comprising a first end wall and a second end wall;
   a connection part integrally connecting the opposite first and second end walls together; and
   a pair of attachment parts each extending axially of the core member from the respective opposite first and second end walls;

wherein the vibration-damping bush is disposed so as to extend in a longitudinal direction of the vehicle body, and
   wherein said first end wall of the stopper member is provided adjacent to a first end surface of the vibration-damping bush in the longitudinal direction of the vehicle body so as to nearly fully cover the first end surface of the vibration-damping bush, and said first end wall of the stopper member has a through-hole formed therein for receiving one side of the core member, while said second end wall of the stopper member is provided adjacent to a second end surface of the vibration-damping bush in the longitudinal direction of the vehicle body, and is configured so as to cover only a part of the second end surface of the vibration-damping bush which is on a side of the connection part.

2. The suspension arm attachment structure of claim 1, wherein the stopper member is adapted to be secured to the vehicle body together with the core member via bolts.

3. The suspension arm attachment structure of claim 2, wherein the first end wall of the stopper member is placed adjacent to a vehicle-rear-side end surface of the vibration-damping bush, and the second end wall of the stopper member is disposed adjacent to a vehicle-front-side end surface of the vibration-damping bush.

4. The suspension arm attachment structure of claim 1, wherein the first end wall of the stopper member is placed adjacent to a vehicle-rear-side end surface of the vibration-damping bush, and the second end wall of the stopper member is disposed adjacent to a vehicle-front-side end surface of the vibration-damping bush.

5. The suspension arm attachment structure of claim 4, wherein the second end wall of the stopper member is set to have an outer dimension larger than that of the front-side end surface of the vibration-damping bush and is provided with a concave part for receiving the core member.

6. The suspension arm attachment structure of claim 5, wherein one of the attachment parts of the stopper member is formed separately from the first end wall and joined thereto, wherein the one of the attachment parts comprises a body part formed to allow passage of the bolt therethrough and adapted to be attached together with the core member to the vehicle body, a reinforcement part bent and continuing from the body part for reinforcing the one of the attachment parts, and an inclined-surface part provided in an bent fashion on a side of the body part which is closer to the vibration-damping bush and adapted to allow passage of the core member therethrough, and wherein end parts of the reinforcement part and the inclined-surface part are welded to the stopper member in a vicinity of the through-hole of the first end wall.

* * * * *